Patented Dec. 8, 1942

2,304,557

UNITED STATES PATENT OFFICE 2,304,557

MANUFACTURE OF THIAZYL SULPHUR HALIDES

William H. Ebelke, Naugatuck, Conn., assignor to United States Rubber Company, New York, N. Y., a corporation of New Jersey No Drawing. Application August 30, 1941, Serial No. 409,001

3 Claims. (Cl. 260—304)

This invention relates to improvements in the making of thiazyl sulphur halides.

An object of the invention is to provide an improved method of producing thiazyl sulphur halides. One method of making such chemicals is described by William E. Messer in his application Serial No. 280,446, filed June 22, 1939, according to which the chemicals are produced by reacting a di-(thiazyl)-disulphide in an organic solvent with substantially dry halogen.

It has now been found that, instead of using the more expensive thiazyl-disulphide as a starting reagent, the parent mercaptothiazole reacts with the halogen to produce what is believed to be an addition product that is convertible by heat to the desired thiazyl sulphur halide. While the invention is principally concerned with the production of arylenethiazyl sulphur halide, and particularly benzothiazyl sulphur chloride, it is not limited thereto.

The course of the reaction is believed to be as follows:

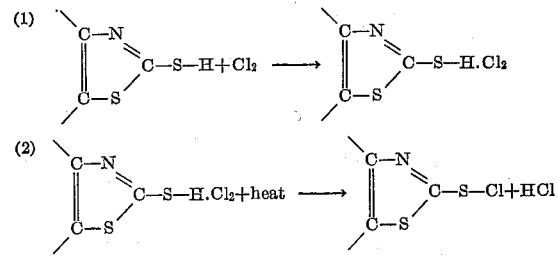

Under the conditions of the reaction only a slight excess of chlorine above the theoretical amount is used. Excess chlorine may be removed by boiling as in the case of carbon tetrachloride or by reaction with the solvent under reflux as in the case of benzene to form a relatively small amount of a chlorinated hydrocarbon. Less than 45 minutes under reflux is usually necessary to complete the conversion of the addition product to the desired thiazyl sulphur halide. The amount of heat applied after or during the introduction of the chlorine should not be greatly in excess of that required to boil the solution until the slurry has dissolved and a substantially clear solution has formed which contains the desired thiazyl sulphur chloride. This can be recovered by evaporation of the liquid, but is best preserved in solution. The yields are almost quantitative.

The reactions may be carried out in a number of organic solvents such as paraffin hydrocarbons (hexane, heptane), halogenated aliphatic hydrocarbons (hexyl chloride, dichlorethane, carbon tetrachloride) and aromatic hydrocarbons (benzene, naphthalene). In general, any organic solvent may be used which is substantially unreactive to the halogen at the temperature of halogenation and to the thiazyl sulphur halide at the temperature of formation of the latter. Solvents like benzene and heptane which are attacked by halogens at an elevated temperature are conveniently used by carrying out the halogenation step at a low temperature (e. g. room temperature) until the addition compound has been quantitatively formed and then heating to a boil to form the thiazyl sulphur halide. In the case of carbon tetrachloride and other completely inert solvents, however, halogenation may be carried out at reflux temperature. Hydrogen halide is simultaneously evolved and the process becomes essentially a one-step reaction.

The following examples are illustrative of the invention, the parts being by weight:

EXAMPLE 1

Preparation of benzothiazyl sulphur chloride (low temperature chlorination)

A suspension of 33.4 parts of mercaptobenzothiazole in 250 parts of benzene is agitated and cooled while substantially dry chlorine is passed in until 14.5 parts have been absorbed. The resulting thick slurry of the probable mercaptobenzothiazole-chlorine addition product is then heated and refluxed about 30 minutes. During this time HCl is evolved and an essentially clear red solution obtained. On cooling a small amount of tar separates and is filtered off. The filtrate gives the characteristic reactions of a solution of benzothiazyl sulphur chloride as prepared from dibenzothiazyl disulphide by the method of William E. Messer, and the isolated product compares in melting range and other properties with that produced by Messer.

EXAMPLE 2

Preparation of benzothiazyl sulphur chloride (chlorination under reflux)

A suspension of 33.4 parts of mercaptobenzothiazole in 300 parts of carbon tetrachloride is agitated under reflux while 20 parts of chlorine are introduced. HCl is evolved and a clear red solution is obtained which on cooling yields only a small amount of insoluble material.

The filtrate has the same characteristics as the solution of benzothiazyl sulphur chloride prepared in Example 1.

EXAMPLE 3

Preparation of (4-methyl)-benzothiazyl sulphur chloride

A suspension of 4-methyl-2-mercaptobenzothiazole in carbon tetrachloride is agitated and cooled while chlorine is introduced. A yellow compound forms, which, on heating, gives off HCl and goes into solution. On cooling no appreciable amount of insoluble material separates.

The clear solution behaves in its reactions as does the solution of its homolog, benzothiazyl sulphur chloride.

EXAMPLE 4

Preparation of (4-methyl)-thyazyl sulphur chloride

A suspension of 4-methyl-2-mercaptothiazole in carbon tetrachloride is treated with theoretical amount of chlorine as in the previous example. An amorphous orange material forms. On heating it gives off HCl and goes into solution.

The solution obtained on filtration gives the reactions characteristic of solutions of other thiazyl sulphur halides.

The invention may be used in the preparation of the corresponding sulphur halide derivatives of the thiazyl sulphides of the naphthalene and anthracene series, as well as those of the benzene series as illustrated by the Examples 1–3.

The iodides and bromides may be similarly prepared by initial use of the corresponding halogen.

Having thus described my invention, what I claim and desire to protect by Letters Patent is:

1. A process of preparing thiazyl sulphur halides which comprises reacting a suspension of a mercaptothiazole in a substantially inert organic solvent with substantially dry halogen and heating the mix with elimination of hydrogen halide until a substantially clear solution ensues, cooling and recovering the thiazyl sulphur halide.

2. A process for preparing an arylenethiazyl sulphur chloride which comprises reacting a suspension of a mercapto-aryl-thiazole in a substantially inert organic solvent with substantially dry chlorine and heating the mix with elimination of hydrogen chloride until a substantially clear solution ensues, cooling the solution and recovering the arylenethiazyl sulphur chloride in the form of a clear solution thereof.

3. A process for preparing a benzothiazyl sulphur chloride which comprises reacting a suspension of a mercapto-benzo-thiazole in a substantially inert organic solvent with substantially dry chlorine and heating the mix with elimination of hydrogen chloride until a substantially clear solution ensues, cooling and recovering the desired benzothiazyl sulphur chloride in the form of a clear solution thereof.

WILLIAM H. EBELKE.